United States Patent Office 3,057,832
Patented Oct. 9, 1962

3,057,832
RUBBER VULCANIZATION
Marlyn J. Brock, Akron, Ohio, assignor to The Firestone Tire & Rubber Company, Akron, Ohio, a corporation of Ohio
No Drawing. Filed May 20, 1959, Ser. No. 814,391
14 Claims. (Cl. 260—79)

This invention relates to the vulcanization of the sulfur-vulcanizable diene natural and synthetic rubbers.

Thiosulfenamides, also known as aminoazole disulfides, are powerful accelerators and curing agents for the vulcanization of natural rubber and the synthetic, sulfur-vulcanizable diene rubbers. These accelerator-curing agents are especially useful in pneumatic tire tread stocks, in which a powerful but delayed-action, non-scorching, curing combination is needed for successful factory processing of the stocks. Since these unique rubber chemicals are generally non-discoloring, they are also useful in white or light colored rubber stocks, such as in pneumatic tire white sidewalls. The thiosulfenamides can be represented by the formula

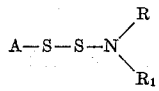

in which A stands for a thiazole, thiazoline, oxazole, imidazole or imidazoline radical, R and $R_1$ are the same or different aliphatic, cycloaliphatic or aralkyl groups or R and $R_1$ together form a single chain (which can contain —$CH_2$—, —O—, —NH— or —S—) constituting with the attached nitrogen atom a heterocyclic radical, and $R_1$ can be hydrogen.

The thiosulfenamides can be produced by reacting an amine monosulfide or disulfide with an azole mercaptan. Suitable amine sulfides includes the following:

N,N'-thio-bis-dimethylamine
N,N'-thio-bis-diethylamine
N,N'-thio-bis-di-n-propylamine
N,N'-thio-bis-di-n-butylamine
N,N'-thio-bis-di-isobutylamine
N,N'-thio-bis-di-n-amylamine
N,N'-thio-bis-di-isoanylamine
N,N'-thio-bis-di-n-hexylamine
N,N'-thio-bis-di-n-heptylamine
N,N'-thio-bis-di-n-octylamine
N,N'-thio-bis-di-benzylamine
N,N'-thio-bis-methyl cyclohexylamine
N,N'-thio-bis-ethyl cyclohexylamine
N,N'-thio-bis-morpholine
N,N'-thio-bis-(thiomorpholine)
N,N'-thio-bis-(4-N-ethyl piperazine)
N,N'-thio-bis-piperidine
N,N'-thio-bis-pyrrolidine
N,N'-dithio-bis-dimethylamine
N,N'-dithio-bis-diethylamine
N,N'-dithio-bis-di-n-propylamine
N,N'-dithio-bis-di-n-butylamine
N,N'-dithio-bis-di-isobutylamine
N,N'-dithio-bis-di-n-amylamine
N,N'-dithio-bis-di-isoamylamine
N,N'-dithio-bis-di-n-hexylamine
N,N'-dithio-bis-di-n-heptylamine
N,N'-dithio-bis-di-n-octylamine
N,N'-dithio-bis-di-benzylamine
N,N'-dithio-bis-methyl cyclohexylamine
N,N'-dithio-bis-ethyl cyclohexylamine
N,N'-dithio-bis-morpholine
N,N'-dithio-bis-(thiomorpholine)
N,N'-dithio-bis-(4 N-ethyl piperazine)
N,N'-dithio-bis-piperidine
N,N'-dithio-bis-pyrrolidine Suitable azole mercaptans include the following:

2-mercaptothiazole
2-mercaptooxazole
2-mercaptoimidazole
2-mercapto-4-methylthiazole
2-mercapto-4-methyloxazole
2-mercapto-4-methylimidazole
2-mercapto-4-ethylthiazole
2-mercapto-4-methyloxazole
2-mercapto-4-methylimidazole
2-mercapto-4-n-propylthiazole
2-mercapto-4-n-propyloxazole
2-mercapto-4-n-propylimidazole
2-mercapto-4-n-butylthiazole
2-mercapto-4-n-butyloxazole
2-mercapto-4-n-butylimidazole
2-mercapto-4,5-dimethylthiazole
2-mercapto-4,5-dimethyloxazole
2-mercapto-4,5-dimethylimidazole
2-mercapto-4,5-diethylthiazole
2-mercapto-4,5-diethyloxazole
2-mercapto-4,5-diethylimidazole
2-mercapto-4,5-di-n-propylthiazole
2-mercapto-4,5-di-n-propyloxazole
2-mercapto-4,5-di-n-propylimidazole
2-mercapto-4,5-di-n-butylthiazole
2-mercapto-4,5-di-n-butyloxazole
2-mercapto-4,5-di-n-butylimidazole
4-phenyl-2-mercaptothiazole
4-phenyl-2-mercaptooxazole
4-phenyl-2-mercaptoimidazole
4-phenyl-5-methyl-2-mercaptothiazole
4-phenyl-5-methyl-2-mercaptooxazole
4-phenyl-5-methyl-2-mercaptoimidazole
2-mercaptobenzothiazole
4-phenyl-2-mercaptobenzothiazole
6-phenyl-2-mercaptobenzothiazole
2-mercapto-tetrahydrobenzothiazole
2-mercapto-naphthothiazole It is an object of the invention to improve or activate the curing and/or accelerating function of thiosulfenamides and to improve the properties of rubber products vulcanized in the presence of thiosulfenamides. Other objects will become apparent in the following description of the invention.

The objects of the invention are realized by vulcanizing a sulfur-vulcanizable rubber in the presence of a thiosulfenamide and additionally in the presence of an acidic activator therefor. The activators suitable for purposes of the invention are the known mercaptan accelerators and compounds which are equivalent therewith at curing temperatures in a rubber stock. A preferred class of activators is the mercaptothiazoles and relate compound convertible thereinto, including 2-mercaptobenzothiazole, homolog thereof, ring substitution products thereof, the zinc salts thereof and the corresponding di- and poly-sulfides. Other activators include 2-mercapto-4,5,6,7-tetrahydrobenzothiazole and corresponding derivatives thereof; 2-mercaptothiazole and corresponding derivatives thereof; 2-mercaptothiazoline and corresponding derivatives; 2-mercaptoimidazole and corresponding derivatives; 2-mercaptobenzimidazole and corresponding derivatives; 2-mercaptooxazole and corresponding derivatives; and 2-mercaptoimidazoline and corresponding derivatives. In addition, certain aldehyde reaction products of the azole mercaptan accelerators are known to decompose to the mercaptan and free aldehyde at conventional rubber curing temperatures, e.g., the formaldehyde reaction product of 2-mercaptobenzothiazole, and these accelerators are especially useful in compounding safe, non-scorching tire tread stocks. Likewise, the azole disulfides, e.g., 2,2'-dithio-bis-benzothiazole, are excellent delayed-action activators, as are also the zinc salts of the azole mercaptan accelerators.

Having generally described the invention, the following examples are presented for purposes of illustration.

EXAMPLE 1

A typical thiosulfenamide, N-morpholinylbenzothiazole-2-thiosulfenamide, and a typical activator, 2-mercaptobenzothiazole were chosen for testing in a white sidewall natural rubber stock, based upon the following masterbatch containing no curing ingredients:

*Masterbatch M*

| Ingredients: | Parts by weight |
|---|---|
| Natural rubber | 100.0 |
| Zinc oxide | 5.0 |
| White pigments | 68.4 |
| Wax | 5.0 |
| Retarder (salicylic acid) | 0.3 |
|  | 178.7 |

The following stocks were mixed in the usual manner, all parts being by weight:

|  | Stock A | Stock B |
|---|---|---|
| Masterbatch M | 178.7 | 178.7 |
| Sulfur | 3.2 | 0.0 |
| Commercial accelerator [1] | 0.5 | 0.0 |
| N-Morpholinylbenzothiazole-2-thiosulfenamide | 0.0 | 3.0 |
| 2-Mercaptobenzothiazole | 0.0 | 2.0 |
| Total | 182.4 | 183.7 |

[1] N-Morpholinyl-2-benzothiazole sulfenamide.

The completely mixed stocks were cured or vulcanized by heating 60 minutes at 280° F. Normal and aged physical properties are given in pounds per square inch (p.s.i.) in Table 1 in accordance with standard rubber testing procedures. The static and dynamic ozone test results were obtained by use of the apparatus and method described in the articles by Ford and Cooper appearing in India Rubber World 124, 696 (September 1951), and 125, 55 (October 1951), entitled "A Study of the Factors Affecting the Weathering of Rubber-Like Materials—I and II." In the tests the ozone concentration was maintained at 60 parts per 100,000,000 parts of air, as indicated. Two types of tests were conducted. In one type called the dynamic test, the sample was repeatedly stretched between the limits of 0 and 20 percent elongation at the rate of 108 cycles per minute. In the other type of test, the static, the samples were maintained stretched at 12.5 percent elongation. The samples were exposed for seven hours as 95° F. No special lights were used. On completion of the test the size and number of the cracks in each sample was compared visually with the size and number of the cracks in a blank which contained no antiozone agent and was tested at the same time as the test sample and under identical conditions.

An arbitrary scale of measuring the results was adopted. The size of the cracks was rated as very fine, fine, medium, coarse, or very coarse; and the number of the cracks was rated as none, very few, few, moderate, moderate to numerous (mod. to num.) or numerous. Larger cracks, regardless of the number, indicates an inferior rubber stock, as the large cracks are likely to grow rapidly until the stock fails; stocks exhibiting fine cracks do not fail until after at least some of the cracks have grown to large cracks.

TABLE 1

|  | Stock A | Stock B |
|---|---|---|
| Normal Properties (60 minutes at 280° F.): |  |  |
| 300% Modulus (p.s.i.) | 650 | 950. |
| Tensile strength (p.s.i.) | 3,400 | 3,500. |
| Percent elongation at break | 660 | 550. |
| Properties After Aging 2 Days at 212° F.: |  |  |
| Tensile strength (p.s.i.) | 1,100 | 2,975. |
| Percent elongation at break | 540 | 540. |
| Standard Ozone Test: 7 Hours, 60 pphm., 95° F. (cure 60 min. at 280° F.)—Static Test: |  |  |
| Type crack | fine to medium | very fine. |
| Amount | numerous | few. |
| Dynamic Test: |  |  |
| Type crack | medium to coarse | fine. |
| Amount | numerous | numerous. |

It is apparent that stock B was superior to conventional stock A in that it had attained a higher state of cure, it aged much better, and it resisted ozone remarkably better than the conventional stock.

EXAMPLE 2

The same accelerator-curing agent and the same activator were tested in a different white sidewall stock, based on the following masterbatch containing no curing ingredients.

*Masterbatch P*

| Ingredients: | Parts by weight |
|---|---|
| Natural rubber | 100.0 |
| Zinc oxide | 5.0 |
| White pigments | 85.2 |
| Stearic acid | 1.2 |
| Wax | 5.0 |
| Retarder (salicylic acid) | 0.3 |
|  | 196.7 |

The following stocks were mixed in the usual manner, all parts being by weight:

|  | Stock C | Stock D |
|---|---|---|
| Masterbatch P | 196.7 | 196.7 |
| Sulfur | 3.0 | 0.0 |
| N-Morpholinyl-2-benzothiazole sulfenamide | 0.5 | 0.0 |
| 2-Mercaptobenzothiazole | 0.0 | 1.0 |
| N-Morpholinylbenzothiazole-2-thiosulfenamide | 0.0 | 5.0 |
| n-Butylammonium oleate | 0.0 | 1.0 |
| Total | 200.2 | 203.7 |

The mixed stocks were tested for tendency to scorch. Both were excellent in this respect. Normal and aged properties were obtained in the standard manner, and also the static ozone test was made. Results are given in Table 2.

TABLE 2

|  | Stock C | Stock D |
|---|---|---|
| Normal Properties (60 minutes at 280° F.): |  |  |
| 300% Modulus | 600 | 675 |
| Tensile strength | 3,800 | 3,075 |
| Elongation | 685 | 570 |
| Properties After Aging 2 Days at 212° F.: |  |  |
| Tensile strength | 2,025 | 2,350 |
| Elongation | 560 | 430 |
| Percent Retention of tensile strength | 53 | 76 |
| Standard Ozone Test (Static): |  |  |
| Type crack | (1) | none |
| Amount | (2) | none |

[1] Fine to medium.
[2] Moderate.

Table 2 shows that stock D was much faster curing than stock C, but it aged better and did not crack when exposed for the standard static ozone test.

EXAMPLE 3

Another experiment was conducted with the masterbatch of Example 1. The following stocks were mixed in the usual manner:

|  | Stock E | Stock F | Stock G |
| --- | --- | --- | --- |
| Masterbatch M | 178.7 | 178.7 | 178.7 |
| N - Morpholinylbenzothiazole - 2 - thiosulfenamide | 3.0 | 3.0 | 3.0 |
| 2-Mercaptobenzothiazole | 0.0 | 0.5 | 1.0 |
| Total | 181.7 | 182.2 | 182.7 |

The mixed stocks were cured by heating at 280° F. for 30, 60 and 90 minutes. Normal physical properties are given in Table 3.

TABLE 3

| Normal Properties at 280° F. | Stock E | Stock F | Stock G |
| --- | --- | --- | --- |
| 300% Modulus: |  |  |  |
| 30 min. cure | (1) | 625 | 700 |
| 60 min. cure | 825 | 900 | 925 |
| 90 min. cure | 900 | 875 | 875 |
| Tensile strength: |  |  |  |
| 30 min. cure | (1) | 3,275 | 3,525 |
| 60 min. cure | 3,625 | 3,475 | 3,700 |
| 90 min. cure | 3,550 | 3,575 | 3,600 |
| Percent Elongation: |  |  |  |
| 30 min. cure | (1) | 610 | 595 |
| 60 min. cure | 580 | 540 | 550 |
| 90 min. cure | 550 | 540 | 550 |

[1] No cure.

Table 3 shows that stocks F and G are much faster curing than stock E, attaining an optimum cure in 60 minutes, whereas stock E requires 90 minutes.

Other thiosulfenamides indicated above can be substituted for the specific one shown in the examples, especially the following:

N-morpholinylbenzimidazole-2-thiosulfenamide
N-cyclohexylbenzothiazole-2-thiosulfenamide
N-dimethylaminobenzothiazole-2-thiosulfenamide
N-piperidinylbenzothiazole-2-thiosulfenamide
N-di-n-propylbenzothiazole-2-thiosulfenamide
N-di-n-butylbenzothiazole-2-thiosulfenamide
N-di-n-amylbenzothiazole-2-thiosulfenamide
N-tt-octyl-(4,5-dimethylthiazole)-2-thiosulfenamide
N-t-butylbenzothiazole-2-thiosulfenamide When used as curing agents the thiosulfenamides are generally useful in the range of 0.5 to 10 or more parts per hundred of rubber by weight (phr.). When used with free sulfur or a sulfur-bearing curing agent (0.1 to 10 phr. free sulfur) the thiosulfenamides can be used to the extent of 0.2 to 5.0 phr. with good results. The activator is generally employed at 0.1 to 3.0 phr.

The curing or vulcanizing temperatures of greatest utility lie in the range of 240 to 400° F., the vulcanizing time varying from several hours at the lower temperatures to a few seconds at the highest temperatures, as will be understood by those skilled in the rubber art.

The sulfur-vulcanizable diene rubbers to which the invention applies include natural or Hevea rubber, various synthetic rubbers such as SBR (butadiene-styrene), BR, IR, ABR, PBR, SIR, neoprene (polychloroprene or CR), butyl rubber (IIR), and mixtures thereof. Reclaimed rubbers can also be utilized alone or mixed with any of the foregoing. The foregoing abbreviations of the rubbers are in accord with the ASTM Designation: D1418–56T.

I claim:
1. Method of vulcanizing rubber comprising heating 100 parts by weight of a sulfur-vulcanizable diene rubber admixed with (1) 0.5 to 10 parts of a thiosulfenamide curing agent of the formula

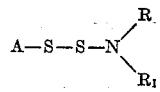

in which A is selected from the group consisting of thiazole, thiazoline, oxazole, imidazole and imidazoline radicals, R is selected from the group consisting of aliphatic, cycloaliphatic and aralkyl radicals, $R_1$ is selected from the group consisting of hydrogen, aliphatic, cycloaliphatic and aralkyl radicals, and R and $R_1$ can be joined through a member of the group consisting of —$CH_2$—, —O—, —NH— and —S— to constitute with the attached nitrogen atom a heterocyclic radical and (2) 0.1 to 3 parts of a mercaptan activator therefor selected from the group consisting of 2-mercaptobenzothiazole, 2-mercapto-4,5,6,7-tetrahydrobenzothiazole, 2-mercaptothiazole, 2-mercaptothiazoline, 2-mercaptoimidazole, 2-mercaptobenzimidazole, 2-mercaptooxazole, 2-mercaptoimidazoline, homologs of the foregoing, ring substitution products of the foregoing, zinc salts of the foregoing, formaldehyde reaction products of the foregoing, di- and poly-sulfides of the foregoing.

2. Method of claim 1 in which A of the formula is thiazole.

3. Method of claim 1 in which A of the formula is thiazoline.

4. Method of claim 1 in which the thiosulfenamide is a benzimidazole-2-thiosulfenamide.

5. Method of claim 1 in which the thiosulfenamide is a benzothiazole-2-thiosulfenamide.

6. A vulcanizable rubber composition comprising 100 parts by weight of a sulfur-vulcanizable diene rubber and admixed therewith (1) 0.5 to 10 parts of a thiosulfenamide curing agent of the formula

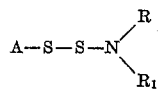

in which A is selected from the group consisting of thiazole, thiazoline, oxazole, imidazole and imidazoline radicals, R is selected from the group consisting of aliphatic, cycloaliphatic and aralkyl radicals, $R_1$ is selected from the group consisting of hydrogen, aliphatic, cycloaliphatic and aralkyl radicals, and R and $R_1$ can be joined through a member of the group consisting of —$CH_2$—, —O—, —NH— and —S— to constitute with the attached nitrogen atom a heterocyclic radical and (2) 0.1 to 3 parts of a mercaptan activator therefor selected from the group consisting of 2-mercaptobenzothiazole, 2-mercapto-4,5,6,7-tetrahydrobenzothiazole, 2-mercaptothiazole, 2-mercaptothiazoline, 2-mercaptoimidazole, 2-mercaptobenzimidazole, 2-mercaptooxazole, 2-mercaptoimidazoline, homologs of the foregoing, ring substitution products of the foregoing, zinc salts of the foregoing, formaldehyde reaction products of the foregoing, di- and poly-sulfides of the foregoing.

7. The vulcanizable rubber composition of claim 6 in which the thiosulfenamide is N-morpholinylbenzothiazole-2-thiosulfenamide.

8. The vulcanizable rubber composition of claim 6 in which the thiosulfenamide is N-dimethylbenzothiazole-2-thiosulfenamide.

9. The vulcanizable rubber composition of claim 6 in which the thiosulfenamide is N-piperidinylbenzothiazole-2-thiosulfenamide.

10. The vulcanizable rubber composition of claim 6 in which the thiosulfenamide is N-cyclohexylbenzothiazole-2-thiosulfenamide.

11. The vulcanizable rubber composition of claim 6 in which the thiosulfenamide is N-tt-octylbenzothiazole-2-thiosulfenamide.

12. The vulcanizable rubber composition of claim 6 in which the thiosulfenamide is N-morpholinylbenzothiazole-2-thiosulfenamide and the mercaptan activator is 2-mercaptobenzothiazole.

13. The vulcanizable rubber composition of claim 6 in which the thiosulfenamide is N-morpholinylbenzothiazole-2-thiosulfenamide and the mercaptan activator is 2,2'-dithio-bis-benzothiazole.

14. The vulcanizable rubber composition of claim 6 in which the thiosulfenamide is N-morpholinylbenzothiazole-2-thiosulfenamide and the mercaptan activator is the zinc salt of 2-mercaptobenzothiazole.

References Cited in the file of this patent

UNITED STATES PATENTS

| 2,273,322 | Jones | Feb. 17, 1942 |
| 2,700,659 | Carr | Jan. 25, 1955 |
| 2,983,726 | Hendry | May 9, 1961 |

UNITED STATES PATENT OFFICE
CERTIFICATE OF CORRECTION

Patent No. 3,057,832                                October 9, 1962

Marlyn J. Brock

It is hereby certified that error appears in the above numbered patent requiring correction and that the said Letters Patent should read as corrected below.

Column 2, line 56, for "relate compound" read -- related compounds --; line 58, for "homolog" read -- homologs --.

Signed and sealed this 12th day of January 1965.

(SEAL)
Attest:

ERNEST W. SWIDER
Attesting Officer

EDWARD J. BRENNER
Commissioner of Patents